June 9, 1964     H. E. G. ARNESON     3,136,151
STATIC BALL BALANCING APPARATUS AND METHOD
Filed July 11, 1961     2 Sheets-Sheet 1
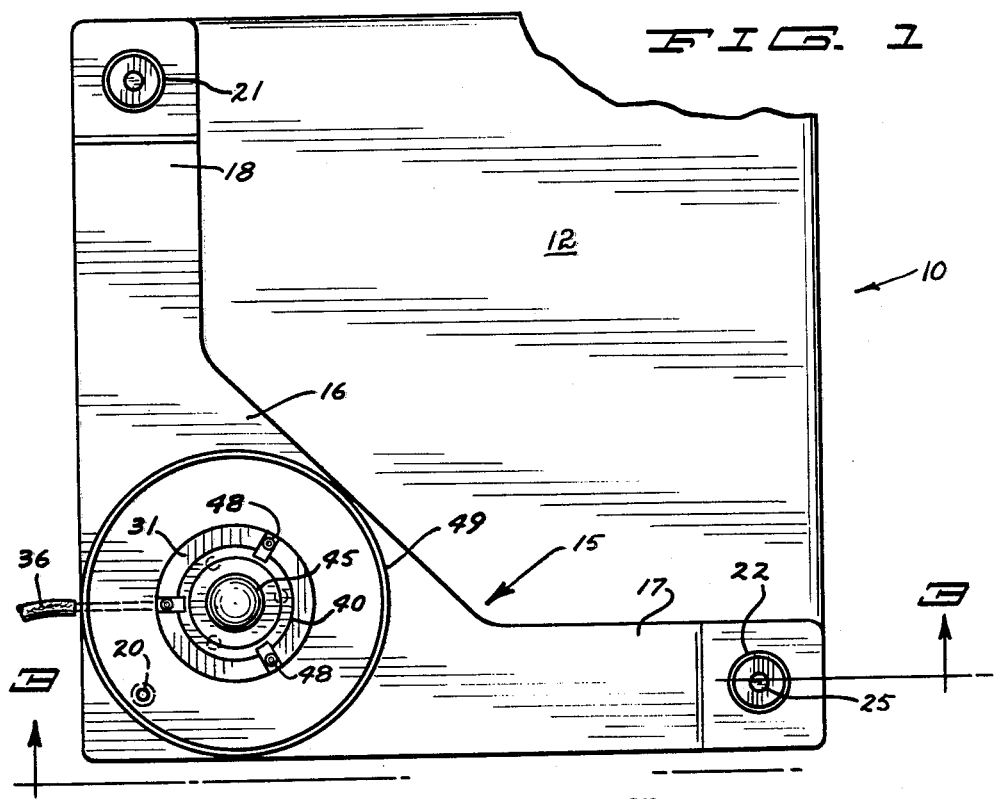
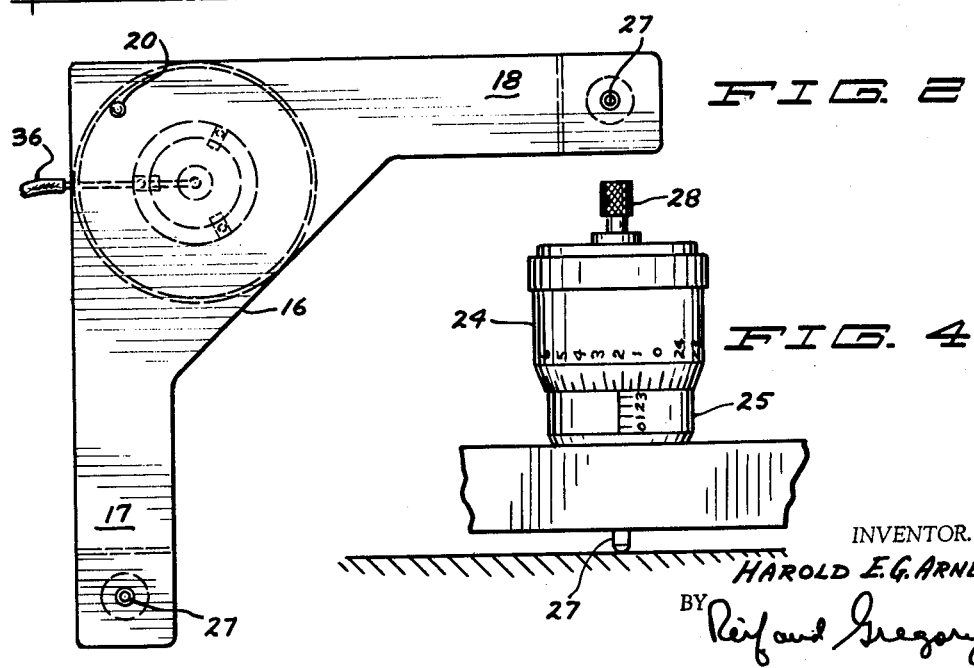
INVENTOR.
HAROLD E. G. ARNESON
BY
ATTORNEYS

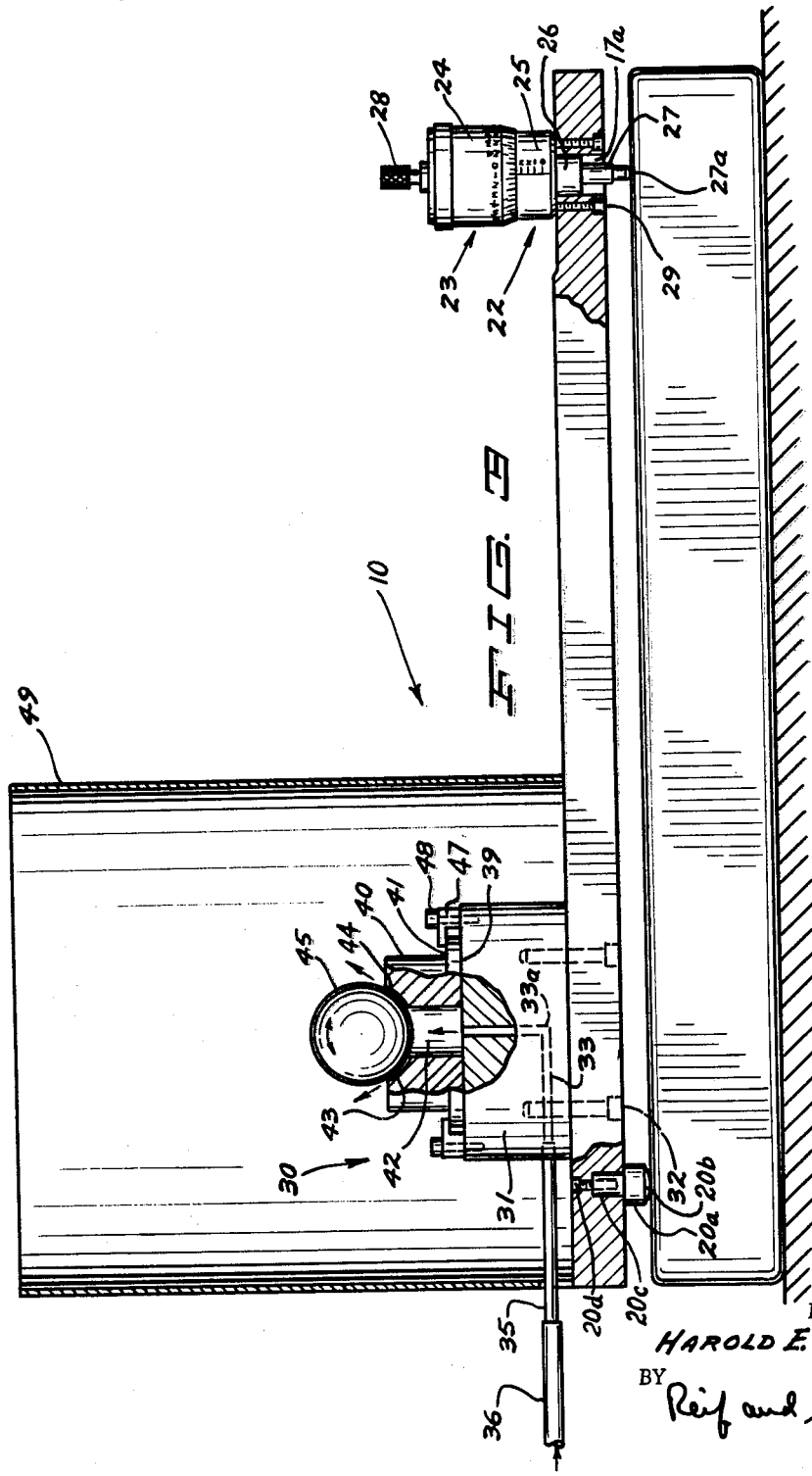

United States Patent Office 3,136,151
Patented June 9, 1964

3,136,151
STATIC BALL BALANCING APPARATUS
AND METHOD
Harold E. G. Arneson, % Professional Instruments Co., 6824 W. Lake St., Minneapolis, Minn.
Filed July 11, 1961, Ser. No. 123,260
6 Claims. (Cl. 73—66)

This invention relates to an apparatus and method for statically balancing a ball. More specifically the invention herein relates to an apparatus and method for determining the point of imbalance of a ball whereby such a point may be corrected to bring the ball into a well balanced condition.

There is a substantial interest of recent development in the use of well balanced balls particularly as rotors in connection with gyroscopes. The balls must have very nearly perfect roundness. A ball may have perfect sphericity and yet have a condition of imbalance due to a lack of homogeneity of the substance in the case of a solid ball or due to the eccentricity of the inner surface in the case of a hollow ball. The applicant has reference to a condition of imbalance represented by a distance on the order of .0000010 inch between the center of sphericity of a ball and its center of gravity. It is desirable therefore to have a simple and easily operated device for determining the condition of the balance of a ball and to indicate the point of imbalance therein for correction of the same. In placing a ball in a well balanced condition the point of the center of gravity of the ball tends to approach coincidence with the center of the sphericity of the ball.

It is an object of this invention therefore to provide a simple device for accurately determining the degree of roundness of a ball.

It is a another object of this invention to provide means for tending to bring the center of gravity of a ball into coincidence with the center of sphericity of said ball.

It is a further object of this invention to position a ball on the head of a column or stream of air, reduce the torque exerted by the air stream on the ball to zero whereby there will be present only the torque that would be exerted by the eccentricity of the center of gravity relative to the center of sphericity of the ball, which torque would cause an oscillation of the ball and by means of the cycle of oscillation the degree of balance of the ball is determined.

It is more specifically an object of this invention to position a ball on the head of a column or stream of air as provided by an air bearing, position said air bearing relative to said ball to reduce the torque exerted by the column or stream of air on the ball to zero whereby the imbalance point of the ball will exert a torque to cause said ball to oscillate and by the successive correction of the point of imbalance as will be determined by the rate of oscillation bring said ball into a balanced condition. The initial spinning of the ball when seated at the head of an air stream is the result of forces tangential to the ball at the air gap between it and the air bearing. By adjustment of the air bearing this torque may be reduced to zero or substantially so with the only torque remaining being that exerted by the presence of an eccentric center of gravity relative to the center of sphericity. This torque causes an oscillation of the ball and as the imbalance is successively reduced, the period of oscillation lengthens to the point where it is no longer discernible and at this point the best achievable balance has been attained.

It is also an object of this invention to provide a method for balancing a ball to determine its condition of balance.

These and other objects and advantages of the invention will be fully set forth in the following description made in connection with the accompanying drawings in which like reference characters refer to similar parts throughout the several views and in which:

FIG. 1 is a top plan view of applicant's device;
FIG. 2 is a bottom plan view of a portion of applicant's device with some portions thereof being shown in dotted lines;
FIG. 3 is a view in side elevation taken on line 3—3 of FIG. 1 as indicated by the arrows, with some portions thereof being broken away; and
FIG. 4 is a fragmentary view of a portion of applicant's device in side elevation on an enlarged scale.

The applicant's device may be variously formed. Essentially the applicant's device comprises a solid base supporting a tiltable plate or table member having an air bearing upstanding therefrom with said air bearing being arranged and constructed to support a ball at the head of a column of air.

With reference to the drawings, the applicant's device 10 as here shown comprises a base member 12 having a flat upper surface and being preferably made of a material to provide a solid vibration-free support, such as of granite. Said base member may take various specific forms and is illustrated as being substantially parallelepiped in form.

Mounted on said base member 12 is a plate or table member 15 shown here as comprising substantially a central triangular portion 16 having side or arm portions 17 and 18 shown here to be of substantially equal length respectively extending outwardly, whereby said member 15 has an overall wing-like appearance in plan. Said table member 15 is supported on said base member 12 by supporting members 20, 21 and 22.

The central supporting member or leg 20 adjacent the corner of said triangular portion 16 is fixed in position and comprises a supporting cylindrical portion 20a having a spherical face or seating surface 20b and having a shank 20c of reduced dimension received within an accommodating bore in said table member 15 with said shank being secured by a headed bolt 20d threaded thereinto through a countersunk bore extending axially from the upper surface of said table member.

The supporting members or legs 21 and 22 are vertically adjustable and are positioned adjacent the free ends of said arm portions 17 and 18. Said supporting member or leg 22 adjacent the free end of the arm portion 17 comprises a micrometer head 23 of a common design having a thimble portion 24 and a barrel portion 25 having suitable indicia thereon, with said barrel portion 25 having a downwardly extending portion 26 of reduced diameter received in a bore 17a of said arm portion 17 and having extending through said bore a spindle 27 having a spherical seating or facing surface 27a resting on the surface of said base member 12. Securing said micrometer head are bolts 29 extending upwardly through said arm portion 17 as illustrated. Extending upwardly of said thimble portion 24 is a knurled thumb screw 28.

The supporting member or leg 21 is identical in construction and operation to said leg 22 and is not here shown in detail. Thus said table member 15 is tiltable by means of the vertical adjustments of legs 21 and/or 22 with reference to the stationary or fixed pivot point formed by said leg 20.

Mounted centrally of said table portion 16 is an air bearing 30 which may take various specific forms and in the present embodiment is shown comprising a cylindrical block 31 held secured by bolts 32 extending upwardly through said table portion 16 and being threaded thereinto. An air passage 33 is shown extending inwardly at one side of said block and having an upwardly extending portion 33a axially of said block. A conduit 35 connects said passage 33 to an air line 36 which communicates with a source of air under controlled pressure.

Seated on said block 31 is a cylindrical bearing head 39 having a reduced upwardly extending portion 40 forming an annular shoulder 41. Said bearing head has an axial passage 42 in alignment with said air passage 33a. Said air bearing head is shown having a spherically concave portion 43 at its upper free end to receive therein partially a work piece in the form of a ball 45. Said air bearing head is arranged and constructed to be interchangeable with other bearing heads having certain different sized concavities respectively to receive different sized balls. Said air bearing head is removably secured by angled clamping members 47 having portions overlying said shoulder 41 at several points thereabout and being removably secured by nutted bolts 48 extending vertically therethrough and being threaded into said cylindrical block 31, as illustrated in FIG. 3.

Upstanding from said plate member 15 extending about said air bearing 30 and having a substantially greater diameter than said air bearing is a cylindrical stack 49 forming a shield to protect said air bearing and the work piece thereon from atmospheric disturbance. Said stack may be removably secured in any suitable manner and will be of a size to permit ready access to the air bearing.

It is well to state here that there may be a difference between perfect sphericity and perfect balance of a ball. At what might be considered the theoretical point of perfection the center of the sphericity of the ball would coincide with the center of gravity thereof. This absolute condition is more readily attained theoretically than is possible in practice. It may be assumed for purposes herein that the ball comprising the work piece is perfectly spherical with the purpose of the applicant's device being to determine the point of imbalance if any is present for correction of such imbalance, or in other words to bring the center of gravity and center of sphericity into coincidence as nearly as possible. The point of imbalance for purposes herein is the eccentricity of the center of gravity relative to the center of sphericity. Hence by the correction of the point of imbalance, as will be indicated through the operation of the applicant's device, the ball will be brought into an unusually high degree of balance. Thus the applicant's device provides for balancing a ball by indicating the point of imbalance.

In commencing the operation of the applicant's device, air under suitable pressure will be passed through passages 33 and 42 to form a column of air on which will be supported the ball 45. The gap 44 between the surface of the concave upper portion of the air bearing head 40 and the adjacent surface of the ball will be of a dimension that will permit the passage of sufficient air therebetween under suitable pressure to form a cushion of air for a substantially friction free support of the ball.

A lack of uniformity in the gap about the ball will result in a spinning of the ball in a given direction as would obviously result from the greater degree of torque exerted by the flow of air at points where the gap is wider. The lack of uniformity of the gap may result from irregularity in the bearing surface adjacent said ball and also may result from a tilting of the axis of the air bearing causing the ball to be positioned eccentrically relative to the air cushion upon which it is supported at the head of said bearing. The table 15 will then be tilted in a direction opposite to the direction of the spinning of the ball to a degree determined by trial and error sufficient to allow the ball to cease spinning and thus to axially adjust the position of the concave portion 43 of the air bearing to reduce the unbalanced forces caused by unequal air flow due to the irregularities in said gap about the adjacent surface of the ball. A relative balance of the air flow at the gap will be made evident by the ball stopping its spinning action. This occurs when the torque exerted by the unequal passage of air about the ball is reduced to a point which is less than the torque exerted by the imbalance of the ball. At this point the imbalance of the ball will be great enough to overcome the remaining unbalanced forces due to the air bearing. Now the center of mass is free to oscillate about the center of sphericity of the ball. Thus the ball will either spin or oscillate according to whether the imbalance of the ball or unbalanced force of the bearing is the greater.

The degree of imbalance will determine the rate of oscillation of the ball. The point of imbalance is readily determinable and the ball is then preferentially lapped to move the center of gravity toward the center of sphericity.

The point of imbalance is determined by observation. As a practical matter it is difficult to make a perfect or complete correction at one time. As correction is made, the torque exerted on the ball by the passage of air thereunder will override the torque exerted by the point of imbalance remaining causing the ball to spin again. The table will be tilted to adjust the axial position of the air bearing relative to the ball to make the air flow at the gap more uniform to the point where the spinning of the ball again ceases and the ball begins to oscillate. The amount of imbalance here noted will be less than that first observed. These successive steps will be repeated. The period of oscillation will lengthen as the condition of imbalance is reduced.

As the condition of imbalance becomes corrected, the torque exerted on the ball to cause it to spin and the torque exerted on the ball to cause it to oscillate will become less and less. Theoretically the above process will continue until the ball will stand at rest. In practice however at some point in the above steps where the center of gravity of the ball and its center of sphericity are approaching coincidence, the pendulous oscillation of the ball will no longer be discernible and the best achievable balance of the ball will have been attained.

In practice it is extremely difficult to bring the center of gravity into coincidence with the center of sphericity of the ball. The balancing process indicated moves the center of gravity of the ball in the direction of the center of sphericity. When the ball is well balanced these two points are at least extremely close to one another.

Applicant's device need not be machined to within an extreme degree of accuracy, particularly with reference to the free end of the air bearing where the ball is supported and the device need not be set on a perfectly horizontal surface. The tilting of the supporting table readily adjusts the axial portion of the air bearing relative to the ball to produce accurate results. It has been found in practice that a ball may be put in a condition of balance within the order of .05 dyne centimeters of being in a perfect condition of balance, that is within this range of having the center of gravity in absolute coincidence with the center of sphericity.

Thus it is seen that I have provided a simply made and simply operated device for quickly and accurately indicating the point of imbalance of a ball for correction of the same whereby said ball may be readily caused to be put in a condition of balance.

It will of course be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claims.

What is claimed is:

1. A balancing apparatus of the character indicated in connection with a spherical object having in combination, an air bearing formed to receive a segment of said spherical object therein, means providing air under pressure to said segment to support said spherical object free of engagement with said bearing, a tiltable member supporting said air bearing to tilt said bearing relative to said spherical object to vary the gap therebetween to balance the forces of air about said spherical object to support the same in a non-spinning condition.

2. A balancing apparatus of the character indicated in connection with a spherical object having in combination, an air bearing having a vertically disposed axis and having a cavity at its upper end portion to receive a segment of said spherical object therein, means providing air under pressure to said cavity to engage said segment to support said spherical object free of engagement with the adjacent surface of said bearing, means supporting said bearing, a pivot member centrally supporting said last mentioned means, and at least a pair of widely spaced vertically adjustable means supporting said last mentioned means respectively to tilt said last mentioned means to adjust the positioning of said bearing to balance the forces of air from said bearing relative to the imbalance condition of said spherical object to support the same in a non-spinning condition.

3. The structure set forth in claim 2, and an air shield disposed about said air bearing for protection against atmospheric disturbance and extending thereabove and supported on said means supporting said bearing.

4. The method of balancing a ball of the character described consisting of the steps of forming a bearing seat at the head of an air stream to support a ball, restricting said air stream about said ball by said bearing seat, said ball being in a spinning condition responsive to the torque of the unbalanced forces of said air stream relative to the condition of imbalance of said ball, tilting said bearing seat sufficiently relative to said ball to vary said torque applied to said ball to establish a condition of relative balance between said torque and said ball to support said ball in a non-spinning condition, whereby the torque of the imbalance condition of said ball predominates and causes said ball to oscillate, determining a point of imbalance from said oscillation, correcting said point of imbalance to the extent that the torque of said air stream is unbalanced relative to the changed condition of said ball to spin said ball, and successively varying the torque of said air stream and removing points of imbalance of said ball until responsive to the balance of torque of said air stream relative to said ball, the oscillation of said ball is no longer discernible at which point the best achievable balance of said ball has been attained.

5. The method of balancing a spherical object of the character described consisting of the steps of forming a bearing seat at the head of an air stream to support said spherical object, restricting said air stream with said bearing seat, the torque of said air stream spinning said spherical object, tilting said bearing seat relative to said spherical object to adjust the forces of said air stream to be in balanced relation with the imbalance condition of said spherical object to support said spherical object in a non-spinning condition, whereby the remaining unbalanced forces of said air stream exert a torque less than the torque exerted by the imbalance condition of said spherical object and said spherical object is in an oscillating condition responsive to said imbalance condition, determining a point of imbalance of said spherical object from said oscillation, correcting said point of imbalance by changing the mass of said object at said point and thus moving the center gravity of said spherical object towards the center of its sphericity to the point where the existing torque exerted by said air stream overcomes the remaining torque exerted by said imbalance of said spherical object and said spherical object resumes a spinning condition, and successively balancing the forces of said air stream relative to said spherical object and the torque exerted by the remaining imbalance of said spherical object to the point where the spherical object ceases to have a spinning condition and oscillation is no longer discernible whereby the best achievable balance of said spherical portion has been attained.

6. The method of balancing a ball of the character described consisting of the steps of supporting said ball at the head of an air stream, restricting the flow of said air stream about said ball, varying the direction of said air stream until the forces of said air stream are in a balanced relation with the imbalance condition of said ball to support said ball in a non-spinning condition whereby the torque of the imbalance condition of said ball thus overcoming the torque of said air stream causes an oscillation of said ball, and determining a point of imbalance of said ball from said oscillation and changing the mass of said ball at said point to move the center of gravity of said ball towards its center of sphericity to the point where said oscillation is no longer discernible at which point the best achievable balance of said ball has been attained.

References Cited in the file of this patent

UNITED STATES PATENTS

| | | |
|---|---|---|
| 2,353,150 | Dietz | July 11, 1944 |
| 2,946,224 | Yamaguchi | July 26, 1960 |

FOREIGN PATENTS

| | | |
|---|---|---|
| 550,738 | Canada | Dec. 24, 1957 |

OTHER REFERENCES

Pages 20, 21: Elements of Mechanical Vibration by Freberg-Kemler, published by Wiley & Sons in 1947.